UNITED STATES PATENT OFFICE.

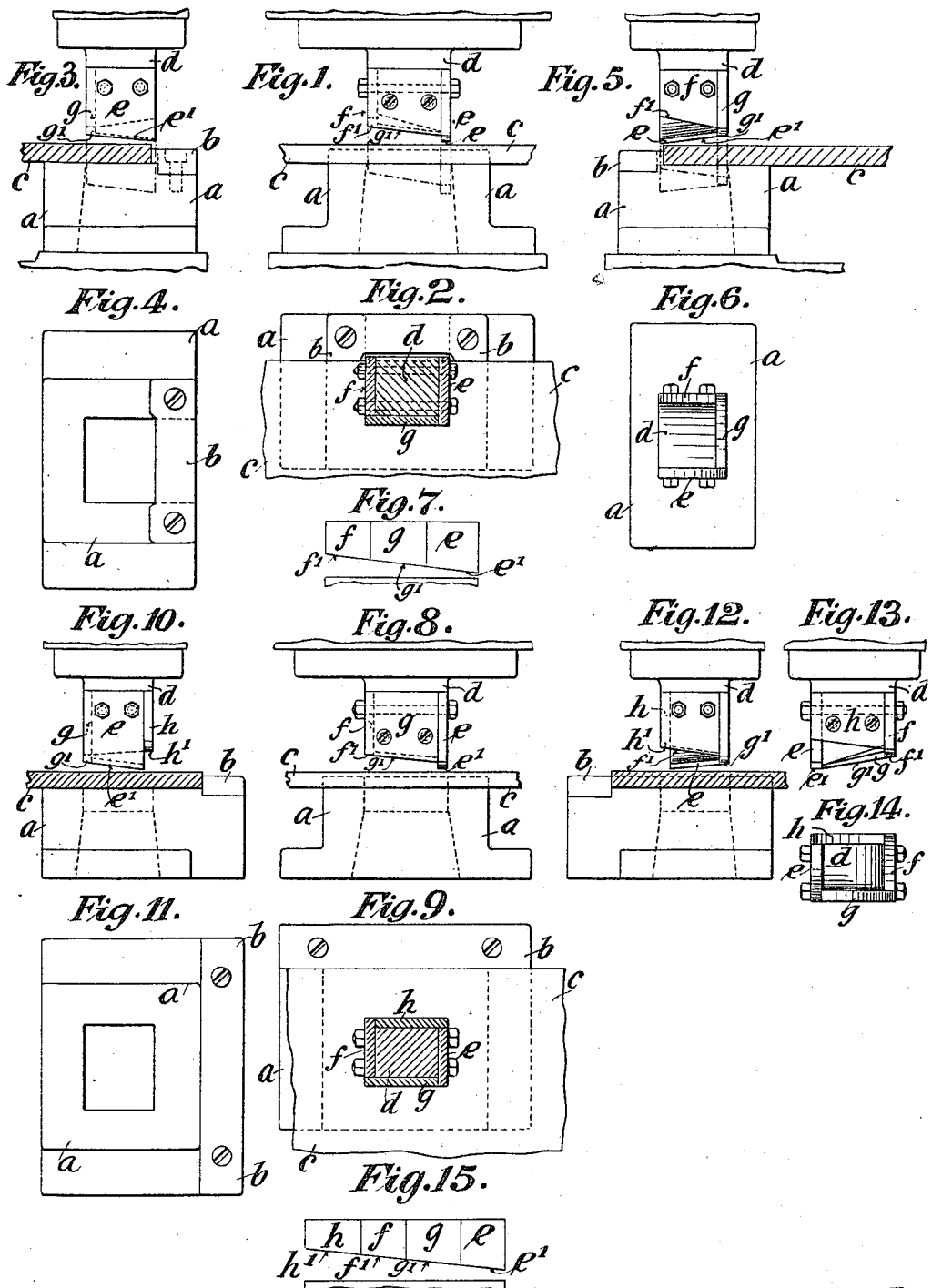

HARRY CAMERON, OF MANCHESTER, ENGLAND.

MACHINE FOR CUTTING RECESSES AND HOLES OUT OF METAL PLATES.

1,322,876.

Specification of Letters Patent. Patented Nov. 25, 1919.

Application filed June 12, 1918. Serial No. 239,549.

*To all whom it may concern:*

Be it known that I, HARRY CAMERON, a subject of the King of Great Britain, residing at Manchester, in the county of Lancaster, England, have invented certain useful Improvements in Machines for Cutting Recesses and Holes out of Metal Plates, of which the following is a specification.

This invention relates to improvements in machines for cutting recesses and holes out of metal plates in which a die and a cutter are employed, and the cutter consists of a rectangular block having secured thereto two side and a front shear blades. Each of the said shear blades has a cutting edge inclining from the back to the front and the said front shear blade a cutting edge comprising two inclines diverging from the middle thereof to the said side blades. The said cutting edges were so disposed in relation to each other that they operated pairwise, that is to say, first those of the two side shear blades and then those of the front shear blade.

In practice it has been found that, owing to the said cutting edges operating together in pairs, the cutter requires a great amount of power and the machine is subjected to great strain.

The object of this invention is to remedy the said defects.

To this end, the invention consists in the provision of means whereby the said cutter will have a perfect shearing action throughout the entire cut and the metal plate will thus be cut gradually which considerably reduces the strain on the machine and will render the cutter and die more durable.

The accompanying two sheets of drawings illustrate this invention.

Figure 1, is a front view, Fig. 2, a sectional plan, Figs. 3 and 5, are side elevations of the die and cutter in their relative positions, Fig. 4, is a plan of the die, Fig. 6, of the cutter inverted, and Fig. 7, a diagram of the cutting edges of the shear blades of the cutter of a machine adapted for cutting recesses. Fig. 8, is a front view, Fig. 9, a sectional plan, Figs. 10 and 12 are side views of a die and cutter adapted for cutting rectangular holes, Fig. 11, is a plan of the said die, Fig. 13, a back view, Fig. 14, an inverted plan of the said cutter, and Fig. 15 a diagram of the shear blade cutting edges of the cutter.

Referring to the Figs. 1–14 generally, $a$ is the die which is of the usual construction and has an abutment piece $b$ against which the plate $c$ to be cut is placed in position and which may be rendered adjustable; $d$ is the improved cutter.

When using the cutter $d$ for cutting recesses in metal plates Figs. 1–6, it consists of three shear blades, namely two side blades $e$, $f$ and a front blade $g$.

According to this invention, each of the said shear blades, has an inclined cutting edge $e'$, $f'$, $g'$ respectively and they are so secured to the cutter head that the lowest point of one blade will join the highest point of the adjacent blade.

The said inclined cutting edges have the same angle and together form one continuous inclined edge operating like a shear blade, as shown in Fig. 7.

In the present instance, the right side shear blade $e$ will operate first, then the front shear blade $g$ and finally the left shear blade $f$.

When using the cutter for cutting out rectangular holes, Figs. 8–14, it consists of four shear blades, two side shear blades $e$, $f$, a front shear blade $g$ and a back shear blade $h$.

Each of the said shear blades has also an inclined cutting edge $e'$, $f'$, $g'$, $h'$, respectively, and they are so secured to the cutter head, that the lowest point of one shear blade will join the highest point of the adjacent shear blade. The said cutting edges are also formed of the same angle so that together they will also form a continuous inclined cutting edge operating like one shear blade, as shown in Fig. 15. In the present instance the right side shear blade $e$ will operate first, then the front shear blade $g$, then the left side shear blade $f$ and finally the back shear blade $h$.

I claim:

1. In a machine for cutting recesses or holes gradually out of metal plates, a cutter comprising a plurality of shear blades with ends rectangularly abutting against each other and inclined cutting edges so disposed that the highest point of one blade joins the lowest point of the adjacent blade to form one continuous inclined cutting edge, for the purpose specified.

2. In a machine for cutting recesses or holes gradually out of metal plates, a cutter comprising a plurality of shear blades with ends rectangularly abutting against each other and inclined cutting edges so disposed that the highest point of one blade joins the lowest point of the adjacent blade, said inclined edges being all formed at the same angle, for the purpose specified.

Signed at Manchester this 30th day of May, 1918.

HARRY CAMERON.

Witnesses:
ALFRED BOSSHARDT,
M. I. BOSSHARDT.